Sept. 20, 1955   G. H. LEONARD ET AL   2,718,450
ELECTRICAL RECORDER WITH AUTOMATICALLY RENEWABLE STYLI
Filed Feb. 3, 1950   3 Sheets-Sheet 1

INVENTORS
GEORGE H. LEONARD
JOHN H. LONG
BY
Carl V. Olson
ATTORNEY

INVENTORS
GEORGE H. LEONARD
JOHN H. LONG

United States Patent Office 2,718,450
Patented Sept. 20, 1955

2,718,450

ELECTRICAL RECORDER WITH AUTOMATICALLY RENEWABLE STYLI

George H. Leonard, Darien, Conn., and John H. Long, Flushing, N. Y., assignors to Faximile, Inc., New York, N. Y., a corporation of Delaware Application February 3, 1950, Serial No. 142,288

3 Claims. (Cl. 346—74)

This invention relates to electrical recorders. While not limited thereto, the recorder of this invention is particularly useful for recording on moist electrolytic paper a plurality of electrical signals through a corresponding plurality of disposable eroding iron stylus electrodes.

It is an object of this invention to provide a recorder in which a supply roll of recording paper easily may be inserted and the end thereof easily threaded in the recorder and drawn taut.

It is another object to provide a recorder having a humidor for a supply roll of moist electrolytic recording paper.

It is a further object to provide a recorder having a plurality of recording styli.

It is a further object to provide a stylus electrode assembly whereby the recording contact surface of the stylus is changeable to present a fresh contact surface when the previously-used surface becomes worn, and whereby electrical contact is always maintained with the stylus.

It is a further object to provide a recorder having a plurality of eroding styli the paper-contacting surfaces of which are periodically renewed, and in which the contact pressure of each stylus on the paper is uniformly maintained at a predetermined value.

It is a further object to provide a recorder having a plurality of styli, a closure for a paper supply chamber, and means responsive to the closure for changing the contact surfaces of the styli.

It is a further object to provide a recorder having a surface over which the recording paper passes after it has been recorded upon so that notations conveniently can be made manually on the recording.

These and other objects will be apparent to those skilled in the art from the following description taken together with the appended drawings which show one presently-preferred embodiment of the invention.

Figures 1, 4:
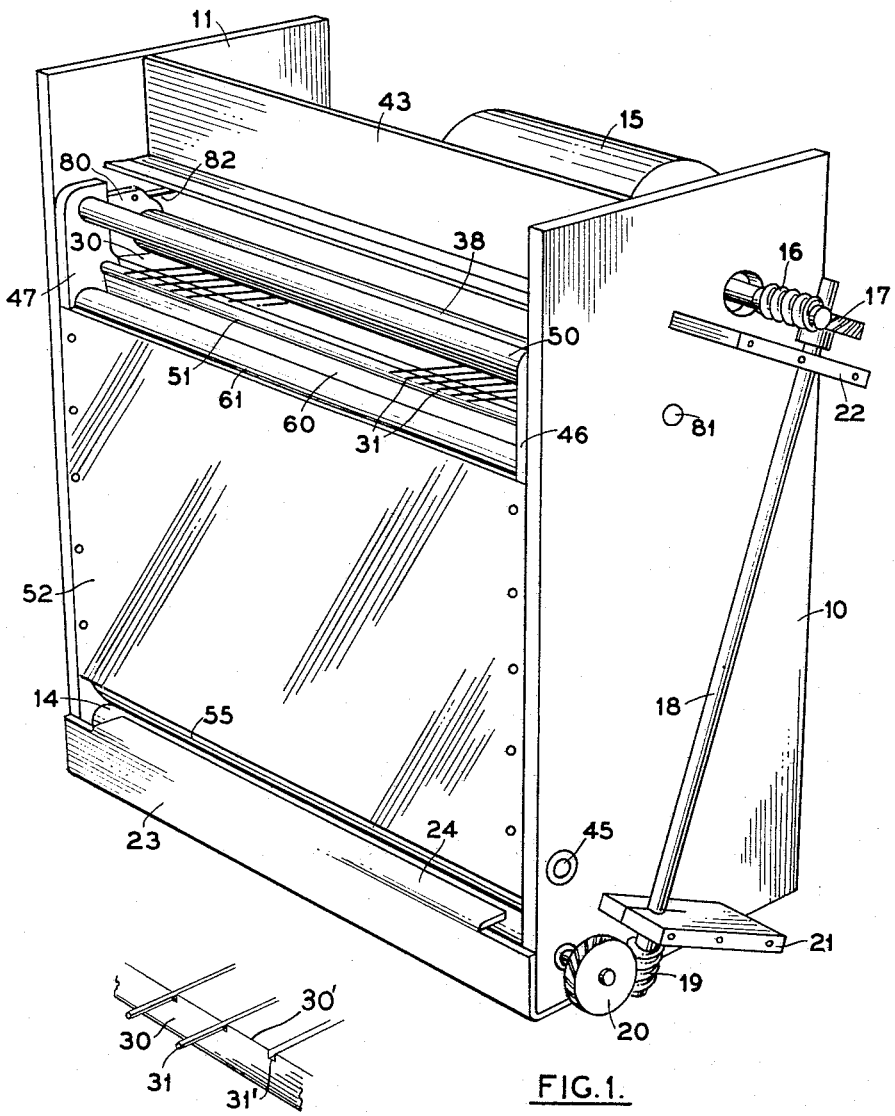
Figure 2:
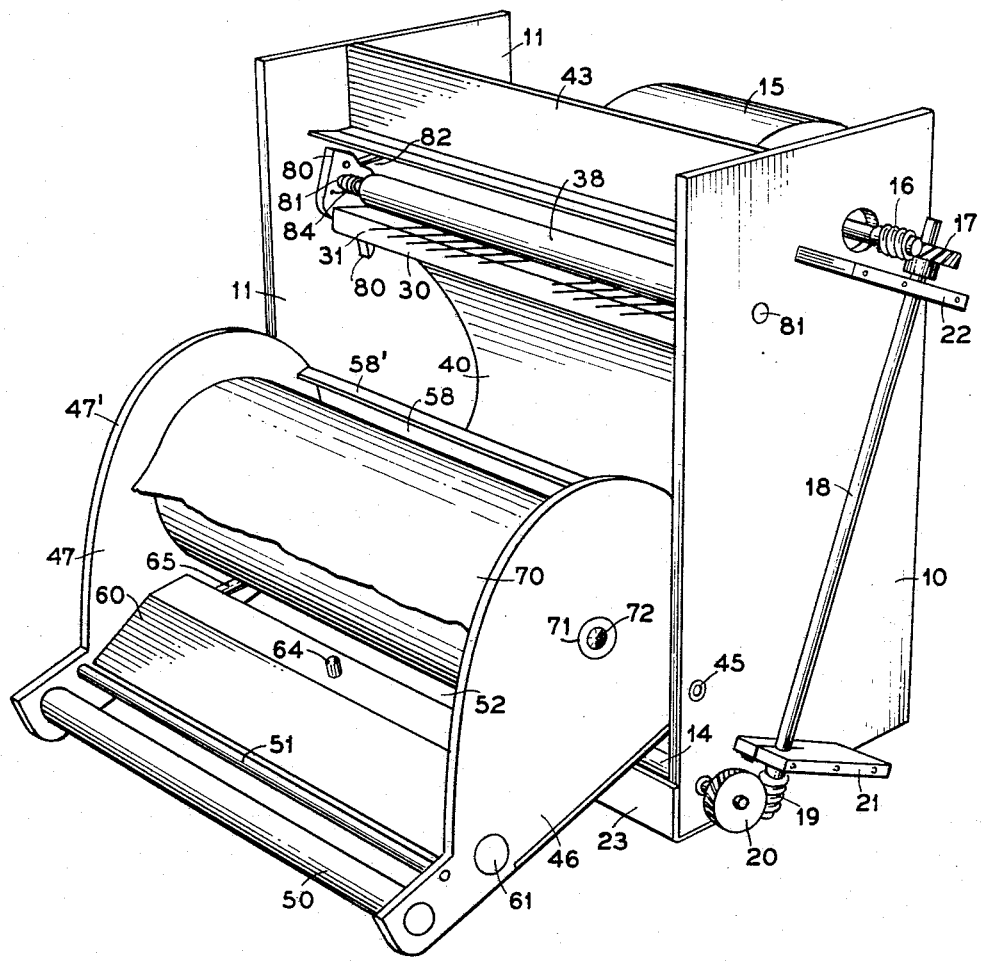
Figure 3:
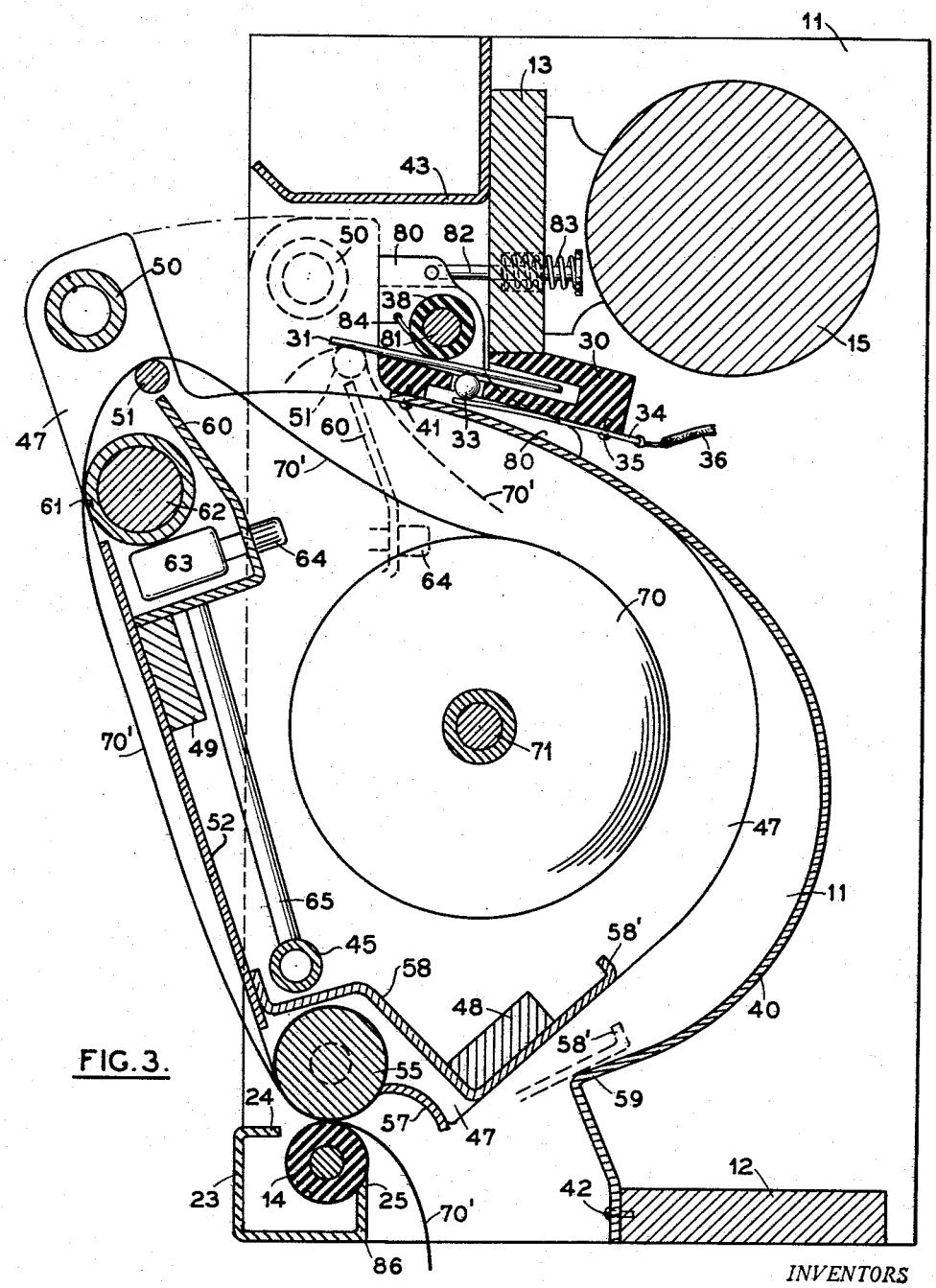

In the drawings, Fig. 1 is a perspective view of a recorder, constructed according to the teaching of this invention, in the normal operating position but without recording paper threaded therethrough. Fig. 2 is a perspective view of the recorder with the door assembly fully opened and showing a supply roll of recording paper therein. Fig. 3 is a sectional view of the recorder with the door assembly partly opened and showing the manner in which recording paper is threaded through the recorder. Fig. 4 is a fragmentary detail view of the styli mounting means.

Referring now in greater detail to the drawings, the recorder frame comprises parallel end plates 10 and 11 separated by spacer bars 12 and 13. A rubber paper feed roll 14 journalled in end plates 10 and 11 is driven by a motor 15 through worm 16, wheel 17, shaft 18, worm 19 and wheel 20; shaft 18 being journalled in brackets 21 and 22 fixed on end plate 10. Motor 15 is mounted on spacer bar 13. A corner piece 23 has a paper threading guide flange 24 and a stripper 25 to prevent the paper from wrapping around feed roll 14.

A stylus assembly including a block 30 of insulating material is fixed to the bottom of spacer bar 13. The forward top surface of block 30 is provided with grooves 31' each accommodating a stylus 31 of stainless steel wire. A hole from the bottom of each channel extends through the block 30 and accommodates a steel ball 33. A conductive spring 34 is provided for each ball 33 and associated stylus 31; one end of each spring 34 is connected to the block 30 by a screw 35 and the other end is operative to urge ball 33 against stylus 31. A wire 36, bearing the electrical signal to be recorded is connected to the end of each spring 34. A rubber covered stylus feed roll 38 is journalled in end plates 10 and 11 so that it bears against the exposed upper portions of styli 31 at points along the styli displaced from the points of contact with balls 33. Rotation of stylus feed roll 38 causes axial movement of the styli in their respective grooves. The friction between the roll 38 and styli 31 is such that the styli may be manually urged into the position shown in Fig. 3 while roll 38 is stationary. The means by which styli 31 are automatically advanced to distribute the wear thereon will subsequently be described.

A resilient formed sheet metal baffle 40 is connected along its upper edge to block 30 by screws 41, and is connected along its lower edge to spacer bar 12 by screws 42. The side edges of baffle 40 are close to (except for a notched out portion to accommodate a follower 80) but not connected to end plates 10 and 11. A tray 43 connected to spacer bar 13 provides a protective shield for the stylus assembly and a convenient receptacle for pencils and tools.

The parts thus far described are substantially fixed in position with respect to the frame of the recorder. A paper-holding assembly or closure will now be described which is hinged to the frame on a tubular axle or pintle 45 journalled in end plates 10 and 11. The paper holding assembly rotatable on axle 45 includes parallel side plates 46 and 47 held in spaced relationship by some or all of the following elements: transverse bar 48, transverse bar 49, handle bar 50, a flange on axle 45, cylindrical recording electrode 51 and face plate 52. It will be noted that the contour of the edges of side plates 46 and 47 is such that the edges mate with the formed sheet metal baffle 40 when the closure is in the closed position. A metal idler feed roll 55 is journalled in side plates 46 and 47 to cooperate with rubber covered paper feed roll 14 on the recorder frame. The centers of axle 45, idler roll 55 and rubber feed roll 14 are arranged so that there is an appreciable gap between idler roll 55 and feed roll 14 when the paper holding assembly is in the open position, to permit easy threading of recording paper therebetween. When the paper holding assembly or closure is moved to the closed position, the center of idler roll 55 goes through the center line between axle 45 and roll 14 to a slightly off-center position when the assembly is completely closed. By this construction, the threaded paper is drawn taut and a form of detent is provided tending to retain the assembly in the closed position. According to a preferred alternative construction, both paper feed roll 14 and idler roll 55 are of metal and the idler roll 55 is journalled in bearing blocks slidably mounted in side plates 46 and 47 with springs urging the bearing blocks and roll 55 toward roll 14.

A stripper blade 57 secured to side plates 46 and 47 insures the downward deflection of paper emerging from between idler roll 55 and feed roll 14. A baffle 58 of formed resilient sheet metal has one edge in closed fixed contact with face plate 52, an adjacent edge in close contact with side plate 46, a second adjacent edge in close contact with side plate 47, and a fourth edge 58' extended from transverse bar 48 for sealing cooperation with the knee portion 59 of baffle 40 on the frame. A heater enclosure 60 of sheet metal likewise extends between side plates 46 and 47 and extends from transverse bar 49 to close proximity with cylindrical recording electrode 51. The heater includes a metallic tube 61 containing an electrical heating element 62 controlled by thermostat 63 which is adjustable by knob 64. Electric current is supplied to the heater by wires (not shown) passing from the exterior of the recorder through tubular axle 45, and conduit 65 to thermostat 63.

As is apparent, the hinged paper holding assembly or closure includes side plates 46 and 47, face plate 52, baffle 58 and heater enclosure 60, all of which cooperate with baffle 40 on the frame to provide a paper supply chamber or humidor. It will be understood that a construction wherein a greater portion of the chamber is defined by baffles connected to the frame and a lesser portion by baffles connected to the closure is within the scope of this invention.

A supply roll 70 of recording paper is rotatable on a spindle 71 journalled in side plates 46 and 47. Spindle 71 may be withdrawn axially when the paper holding assembly is in the position shown in Fig. 2 for the removal or insertion of supply roll 70. Pointed end 72 is spring mounted on spindle 70 to cooperate with depressions (not shown) on the inner side of end plate 10 to retain the paper holding assembly in intermediate threading and completely closed positions.

The recorder of this invention is especially useful for recording with a positive iron or steel electrode on a moist electrolytic paper of the type described in U. S. Patent No. 2,339,267 issued on January 18, 1944 to John V. L. Hogan et al. In this recording process, iron in the positive electrode is deposited on and in the paper. To distribute the erosion or wear of the positive styli 31, means are provided for automatically extending the styli each time the paper holding assembly is opened to insert a fresh roll 70 of recording paper. In this manner the erosion of the styli is distributed along a substantial portion of their length and they need be replaced only after a long period of use.

The automatic stylus advancing means includes a follower 80 journalled on the shaft 81 of rubber stylus feed roll 38. A pin 82 pivotally connected to follower 80 passes through an aperture in spacer bar 13 and carries a compressed coil spring 83 which tends to pull follower 80 to the position shown in Fig. 2. A spring-type clutch 84 wrapped around shaft 81 is secured at one end to follower 80. When spring 83 rotates follower 80 to the position shown in Fig. 2, spring clutch 84 grips and rotates shaft 81 thereby causing roll 38 to advance the styli 31 axially by a small amount. This occurs whenever the paper holding assembly or closure is opened removing the edge 47' of side plate 47 from contact with follower 80. When a fresh supply of paper has been inserted and the assembly is closed, the edge 47' of side plate 47 returns follower 80 to the position shown in Fig. 3. During this return rotation, spring-type clutch 84 slips on shaft 81 and roll 38 remains stationary.

The manner in which recording paper 70' from supply roll 70 is threaded through the recorder is apparent from Fig. 3 bearing in mind that an appreciable space exists between feed roll 14 and idler roll 55 when the paper holding assembly is in a more fully opened position. When the assembly is in the closed position, the curved edges of side plates 46 and 47 make close contact with the resilient baffle 40 formed to the same contour. The baffle 58, the enclosure 60, the negative cylindrical recording electrode 51, the handle 59 and the recording paper 70' assume the positions represented by dotted lines in Fig. 3. It is apparent that when the recorder is in the normal closed operating condition the supply of moist recording paper is completely enclosed so that it will retain its necessary moisture content for a long period of time even though the recorder be idle.

Referring to Fig. 3, it will be noted that when the paper holding assembly is in an open position, each stylus 31 is supported solely at three points by spring-urged ball 33, the stylus feed roll 38 acting as a fulcrum and the edge 30' of block 30. When the paper holding assembly is closed, recording electrode 51 lifts the extended end of each stylus 31 off the edge 30' of block 30. The construction is such that each stylus 31 is urged with a constant pressure against the paper 70' passing over recording electrode 51 throughout the life of the stylus during which it is progressively extended from the position shown in Fig. 3. The construction also provides for good electrical contact with each stylus at all times and for easy replacement of worn styli.

The paper 70' is electrically recorded upon when it passes between the positive styli 31 and the negative cylindrical electrode 51. Electrode 51 may be maintained at ground potential and thus need not be insulated from the frame of the recorder. After being recorded upon, the paper 70' passes immediately over the heater 61 which dries and irons the paper and intensifies the recording after the manner set out in U. S. Patent No. 2,485,678 issued on October 25, 1949 to W. H. Tribble. The paper then passes over face plate 52 where pencil notations may conveniently be made on the recorded paper. The paper thus drawn through the recorder by paper feed roll 14 and idler roll 55 issues from the bottom of the recorder as shown in Fig. 3. The recorded paper may if desired be torn off across the sharp corner 86 of stripper 25.

It will be understood that the single embodiment herein shown and described is in some respects only illustrative and that the invention is susceptible of embodiment in various other forms within the spirit and scope of the appended claims.

What is claimed is:

1. An electrical recorder comprising in combination, a frame, a curved sheet baffle on the frame, a closure hinged on the frame including a front member and side plates having edge contours cooperating with said curved sheet baffle to form a paper supply chamber when the closure is closed, at least one stylus mounted on the frame external of said chamber, a recording electrode mounted on said closure external of said chamber to cooperate with said stylus, and means in contact with said stylus operated by said closure to advance the stylus each time the closure is opened.

2. An electrical recorder comprising in combination a frame, a closure for a paper supply chamber hinged on the frame, at least one stylus mounted on the frame external of said chamber, a recording electrode mounted on said closure for cooperation with said stylus with said paper therebetween, and means in contact with said stylus operated by said closure to advance the stylus each time the closure is opened.

3. An electrical recorder comprising in combination a frame, a closure for a paper supply chamber hinged on the frame, a plurality of styli mounted on the frame external of the said chamber, a linear electrode mounted on said closure for cooperation with said styli with the said paper therebetween and a roll in contact with said styli and operative to advance said styli simultaneously and axially each time the said closure is opened.

References Cited in the file of this patent
UNITED STATES PATENTS

| Number | Name | Date |
| --- | --- | --- |
| 983,061 | Jetter | Jan. 31, 1911 |
| 1,926,863 | Wight et al. | Sept. 12, 1933 |
| 2,263,375 | Barnett | Nov. 18, 1941 |
| 2,292,119 | Hackenberg et al. | Aug. 4, 1942 |
| 2,375,267 | Wise | May 8, 1945 |
| 2,421,673 | Young | June 3, 1947 |
| 2,453,484 | Young | Nov. 9, 1948 |
| 2,485,678 | Tribble | Oct. 25, 1949 |
| 2,575,959 | Hogan | Nov. 20, 1951 |